Patented June 12, 1934

1,962,577

UNITED STATES PATENT OFFICE 1,962,577

METHOD OF PRODUCING MOLDED COMPOSITIONS FROM ASBESTOS

David Wolochow, Ottawa, Ontario, Canada

No Drawing. Application April 2, 1932, Serial No. 602,879

4 Claims. (Cl. 18—48)

This invention relates to molded compositions derived from asbestos and to a method of preparing the same.

In the preparation of chrysotile asbestos for known commercial uses, substantial quantities of the silicate go to waste because they are not in a form adapted for present uses.

The object of this invention is to provide a method whereby this waste material, or other asbestos material, may be economically treated to provide various types of molded products which have characteristics which adapt them for a wide field of use. This waste asbestos may be in the form of short fibre, sand or dust.

In accordance with this invention, chrysotile asbestos fibre is treated with an acid solution to form a plastic mass, which may be molded into the required shape and dried. If the drying is effected at room temperature, the molded product will have some strength after a considerable length of time but the shrinkage is too great to give a satisfactory product. The molded mass is thus dried at an elevated temperature.

As illustrative of the effect of temperature and time of drying, the following example is given. 960 grams of short asbestos fibre were mixed with 528 cc. of 45% phosphoric acid and the plastic mass was formed into standard briquets. Dried at room temperature the briquets remained soft for over 24 hours but developed a tensile strength of 650 lbs. per square inch in 30 days. Considerable shrinkage took place under these conditions.

Drying at 40° C. for 18 hours gave a tensile strength of 450 lbs. per square inch;

Drying at 80° C. for 10 hours gave a tensile strength of 860 lbs. per square inch;

Drying at 120° C. for 4 hours gave a tensile strength of 860 lbs. per square inch;

Drying at 150° C. for 40 minutes gave a tensile strength of 885 lbs. per square inch.

It will thus be apparent that the drying temperature and time to be employed will be determined by the strength required in the finished product and, to some extent, by conditions in the plant.

The concentration and the volume of acid used affect the strength as well as the density of the molded products. For light weight products it is best to use an acid of low concentration and a substantial volume since this leaves more fibre, less colloidal silica and more water in the mass. The removal of the water on drying makes the product more or less porous. For products of higher specific gravity it is best to use a stronger acid with a small volume. This is illustrated by the following examples:

200 grams of short fibre asbestos are treated with 150 cc. of 15% phosphoric acid, molded and dried at 120° C. for 18 hours. The tensile strength is 90 lbs. per square inch and the specific gravity about one.

200 grams short fibre asbestos are treated with 150 cc. of 45% phosphoric acid, molded and dried at 120° C. for 18 hours. The tensile strength is 460 lbs. per square inch and the specific gravity about 1.4.

200 grams of short fibre asbestos are treated with 100 cc. of 45% phosphoric acid, molded and dried at 120° C. for 18 hours. The tensile strength is 600 lbs. per square inch and the specific gravity about 1.5.

The following examples are illustrative of the operation of the process.

A light weight material, having a specific gravity of about 1, is made by treating 800 grams of short fibre asbestos with 600 cc. of 15% sulphuric acid. The acid is added to the fibre and well mixed. The plastic mass is molded as desired and dried at 150° C. for about 2 hours. The tensile strength of the material is about 175 lbs. per square inch.

For a heavier material having a specific gravity of about 1, 75, 2000 grams of short fibre asbestos is well mixed with 1000 cc. of 45% phosphoric acid which is added thereto. The plastic mass is molded and dried at 120° C. for 1 hour. The tensile strength of this product is about 650 lbs. per square inch.

The most suitable acids are phosphoric, sulphuric and hydrochloric, although if too concentrated, sulphuric evolves too much heat for successful use. Sulphuric acid of about 60% and phosphoric of about 45% are suitable concentrations.

Molding the plastic mass under pressure increases the strength of the products formed. Using a pressure of 500 lbs. has given an increase of 20 to 40% in the tensile strength.

Various aggregates or fillers, such as rock, sand, sawdust, bark, straw, carbonates of lime or magnesia, etc., may be incorporated in the plastic mass.

Owing to the properties of this material and the strength developed in the molded products by this method of treatment, it will be apparent that various articles of commerce may be made by the present method.

I claim:

1. A method of producing useful products from chrysotile asbestos fibre, which comprises adding a mineral acid of the group sulphuric, phosphoric and hydrochloric and of a concentration not exceeding 60% to the asbestos fibre, mixing the same to form a plastic mass, molding the same and drying at a temperature exceeding 100° C. until stability of volume of the molded mass is reached.

2. A method of producing useful products from chrysotile asbestos fibre, which comprises mixing short asbestos fibre with sulphuric acid in substantially the proportions of 8 grams fibre to 6 cc. of sulphuric acid of specific gravity, 1.10, molding the plastic mass and drying the molded products at about 150° C. for substantially 2 hours.

3. A method as defined in claim 1, wherein the plastic mass is molded under pressure.

4. A method of producing a molded product from a short asbestos fibre, which comprises mixing with the fibre phosphoric acid of a concentration of about 45% in substantially the proportion of 2 grams fibre to 1 cc. of acid, molding the mass and drying at about 120° C. for about 1 hour.

DAVID WOLOCHOW.